INVENTORS
CHRISTIAN MEISEL et al

AGENT

INVENTORS
CHRISTIAN MEISEL et al

BY

AGENT

United States Patent Office 3,445,585
Patented May 20, 1969

3,445,585
CABLE DISTRIBUTION BOX
Christian Meisel and Günter Salewski, Meissen, and Rudolf Bock, Dresden, Germany, assignors to VEB Kabelwerk Oberspree (KWO), Berlin-Oberschoneweide, Germany
Filed Dec. 6, 1967, Ser. No. 688,508
Int. Cl. H01r 13/46
U.S. Cl. 174—59          24 Claims

ABSTRACT OF THE DISCLOSURE

Cable distribution box for telecommunication cables and conductors, as well as for conductors of larger cross sections, comprising in a closed housing a number of elongated mounting plates adapted to receive connecting elements which may be blocks or connectors. Various structural elements are provided on the walls of the housing, the mounting plates and the connecting blocks for securing, guiding and attaching the wires of the cables and conductors. Designation plates may be provided for ready identification. The box is adapted for under- and over-plaster installation. The connecting blocks have openings for receiving attaching means which may be in the form of clamping pins, soldering pins or coiling pins for the wires.

---

The invention relates to a cable distribution box for connecting telecommunication cables, particularly inside cables, for under- or over-plaster installation. The most important parts of the cable distribution box are preferably made of plastic materials.

Cable distribution boxes are known where connecting blocks are screwed on stirrups on the rear wall of the housing parallel to each other and side by side in a vertical direction. The number of connecting blocks in a cable distribution box depends on the number of double wires or pairs of the cables and/or lines which are to be connected in the cable distribution box. As a rule, each connecting block contains two parallel rows of connecting pins for ten double wires each. These connecting pins are provided at one end with soldering lugs and at the opposite end with screw terminals so that the wires of the incoming cable can be soldered and the wires of the outgoing lines can be clamped on. In order to facilitate the assembly, the connecting pins of the upper row are staggered relative to the connecting pins of the bottom row. In addition, the connecting pins of the bottom row are longer than those of the upper row.

The connecting blocks consist of several parts, namely of an insulating bases plate, several insulating bars, a head portion pressed of insulating material, connecting pins of different lengths and screws for assembling the insulating parts. The structure of the connecting blocks is such that the insulating bars are arranged between the insulating base plate and the head portion in vertical position, parallel to each other. The insulating bars are provided with openings to receive the connecting pins. Corresponding to the distance between the insulating bars, the connecting pins are stamped through in the center. The pins inserted between the insulating bars are thus secured against lateral displacement. Under the connecting blocks are secured so-called distributing plates.

In the assembly, the wires are fed through the holes or slots of the distributing plates to the soldering lugs or screw terminals of the connecting blocks, connected, tightened underneath the distributing plates and bent over in a loop. The forming of a pig-tail on the cable is thus avoided.

A cable distribution box is furthermore known for installation in open air, which requires little space. In this construction several cable heads are mounted parallel in a tub of corrosion-resistant aluminum alloy. The housing is terminated by a hood provided with a gasket. Within the mounted cable heads, the connecting elements in plate form if five double wires each are inserted into the insulator in vertical direction in such a way that the offset bushes extend parallel to the opening at the head end of the cable head. Parallel to the connecting elements are arranged in the insulator, at an angle to the vertical reference plane, openings which start at the head end and terminate on the front side of the cable head. Into each of these openings are introduced two jumper wires, and the bronze wires stripped of their insulation are put vertically into the bushes.

Furthermore, soldering and coiling distributor links with connecting lugs are known which are pressed into the insulator perpendicularly to the fastening plane. The connecting lugs are either staggered or arranged in parallel rows, and they can be connected with each other by a conductive strap.

In addition, control cabinets with pivotable racks are known. The racks are subdivided on the rear side and the insulating plates are equipped with switching elements.

A cable distribution box has already been suggested where the connecting blocks are superposed in the housing in a cascade arrangement at an acute angle to the rear wall. The slotted connecting blocks are arranged in this design asymmetrically on a distribution plate. These groups are arranged for displacement in the cable distribution housing on lateral rails which have a rear stop and a safety element at the front end in such a way that the wire loops behind them are covered. The connecting elements are inclined in the direction of the distribution plate and are freely accessible.

The known cable distribution boxes have the disadvantage that the housings must be relatively large. This is particularly true for those cable distribution boxes which are provided for connecting cables having a large number of conductors or wires. Due to the small number of connecting pins in the connecting blocks and the arrangement of the latter, optimum utilization of the cable distribution box space cannot be achieved. Difficulties result also in the wiring of the cable distribution boxes because the connecting pins are arranged deep in the cable distribution housing and consequently they are not easily accessible. It must therefore be removed when the housing frame is assembled. Another disadvantage is that the connecting blocks consist of a great number of parts. Several tools and apparatus are therefore required for the production and assembly of the individual parts.

In cable distribution boxes consisting of cable head and cable distribution housing, the space is well utilized but an economical use of these devices in closed rooms is not ensured. All plugs must be bronze conductors. It is thus necessary to supply with the cable head a cable of about 6 meters length with bronze conductors. This cable must be adapted, if possible, to the connection capacity of the cable head because this is the only way to ensure a profitable manufacture of the special cables. The cable head is lead out for 50 double wires (twin conductors); however, and particularly in closed rooms, cable distribution boxes are frequently used, in which substantially fewer wires are connected.

This is particularly true when old distribution boxes must be replaced in existing plants by new ones where poor utilization of the cable is unavoidable in most cases. Beyond that there are considerable vibrations in closed rooms, particularly in industrial buildings. It is therefore possible that the transfer resistances will increase unduly after a certain time in the offset bushes in the connection of the bronze conductors.

The vertical arrangement of the connecting lugs in parallel rows in the known soldering and coiling distributor links has a space-saving effect in depth while the width and height of the cable distribution housing must be maintained unchanged because the assemblyman needs room inside the cable distribution housing for the lateral guidance and arrangement of the cable wires.

It was found that the outer form of the housing presents molding difficulties in the suggested cable distribution boxes particularly if they are to be made of plastic materials. The production of the housing requires complicated molding tools which are expensive and susceptible to trouble. Another disadvantage is that the entire groups must be removed from the lateral rails for the assembly of the cables so that the necessary wire loops can be laid.

It is one of the major objects of the invention to provide a cable distribution box where a larger number of connecting elements can be accommodated by improved utilization of the space in the distribution housing without impairing the assembly or mounting of the cables by the reduced space requirement. Furthermore, the uncomplicated design of the cable distribution box results in a smaller number of parts and thus in a more economical production.

The invention is therefore based on the problem of permitting the assembly or installation of telecommunication cables, particularly telephone and control cables, with different conductor dimaeters by an expedient design and arrangement of the connecting elemets in the cable distribution housing, and of arranging the assembly plane of the telephone cables to be assembled outside the housing. At the same time the connecting elements for the assembly of the telephone cables should be exchangeable without loosening screws and should be useable both for under- and over-plaster installations.

According to one of the important features of the invention this problem is solved so that hinge lugs are provided in the cable distribution housing on one side wall, bearing surfaces and projections on the opposite side wall, as well as fastening pieces and superposed parallel T-shaped wire guide forks on the rear wall. In the housing, secured on the rear wall, in a vertical direction and parallel to each other, are flat terminal strips for larger conductor cross sections, and above on the hinge lugs, pivotable mounting plates for connecting telephone cable wires. Each mounting plate contains at the front and foot ends opposing, preferably oblong, open slots which may be tapered in the direction of the cover.

According to other features, in horizontal direction, in the center of the mounting plates, are provided rectangular openings which are conical at the long sides in a direction toward the rear wall of the housing. The openings are interrupted by vertical crossbars molded on the rear sides of the plates. On their front sides, the openings are limited laterally by ribs in such a way that a connecting block inserted into the opening is guided between the ribs and locked on the mounting plate by a corresponding safety element. The opposing slots are preferably staggered in the mounting plates.

On the plates are also provided, according to further features, hinge lugs and loops to permit the mounting plates to be swung out of the cable distribution housing. For holding the wires there are provided parallel opposite cut-outs in the mounting plates.

Into the rear wall of the housing are pressed holes which serve to screw on fastening stirrups and the flat terminal strips mentioned before.

On the rear wall of the housing there is a grounding plate with measuring bushes, and several parallel screw terminals are provided thereon, secured by means of a screw.

Several tongues, for fastening the incoming and outgoing cables, are rigid with the rear wall of the housing.

It is of advantage, according to the invention, if breakaway cable inlets are arranged on all sides of the housing. At both sides of the cable inlets, are the front and foot ends of the housing, are arranged straps. Beyond that, folds are provided in the corners of the housing.

If the cable distribution box is to be used for underplaster mounting, a blind frame is secured on the housing on the fastening pieces by means of distance bolts. The cover has preferably notches in the corners which engage the folds of the housing or the blind frame.

On the rear side of the cover, a stirrup, which is provided with an opening, is integral with the cover.

The rectangular conical opening of the mounting plates is so designed that opposite teeth are obtained. These teeth serves as safety elements which are adapted to engage spring-like hooks of the connecting blocks.

The blocks preefrably consist of symmetrical half shells which are connected by screws.

Each connecting block has openings destined to receive attaching or connecting elements, such as clamping, soldering or coiling pins. Inside the connecting block the above-mentioned attaching elements are provided with right-angled terminal portions.

The clamping, soldering or coiling pins opposing each other in the connecting blocks are secured by an inserted insulating strip.

On the front side, the connecting blocks have grooves with inserted designation strips.

Instead of the connecting blocks with the above-mentioned attaching elements can also be used so-called B-wire connectors or wire connecting sleeves. The connectors are inserted after installation into the oblong slots of the mounting plates. In this case a designation strip may be inserted in each mounting plate behind the rectangular opening, between the opposite teeth and the crossbars.

Yet further features of the invention relate to the fact that the cable distribution housing is reduced by arranging the mounting plane outside the cable distribution box. The mounting of the cables is not impaired by the reduction of the housing since the mounting plates can be swung out completely from the housing. The flat terminal strips mounted on the rear wall of the housing are thus readily accessible. The cable distribution box according to the invention can thus be used at the same time for connecting telephone cable wires and control cable wires. The simple exchangeability of the connecting blocks permits the use of the cable distribution box for all connection possibilities occurring under various field conditions. The hitherto used variety of types is thus limited to a great extent.

Beyond that the cable distribution housing has been so designed that it is technically possible to combine a plurality of parts by form-closed or rigid connection with the housing. Since the mounting plates, connecting blocks, as well as the cover can be produced as molded parts, the economy of the production is substantially increased. Furthermore, the working productivity can be considerably increased in the manufacture of the cable distribution boxes according to the invention.

The various objects, features and attendant advantages of the present invention will become more apparent from the following description of a preferred, exemplary embodiment of the inventive cable distribution box, when considered in conjunction with the accompanying drawings, wherein FIG. 1 shows a front view of a cable distribution box according to the invention, with the cover removed, and partly broken up;

The preferred, exemplary embodiment of the cable distribution box comprises a housing generally designated by numeral 1. It is preferably made of a suitable thermoplastic material but it is also possible to make the housing of a duroplastic material. According to FIGS. 1 and 2, in the housing are arranged preferably plastic mounting plates 2, preferably provided with oblong slots 3, in a laterally offset arrangement, as shown. The box is thus laid out for 40 cable pairs or double wires. Naturally the box can also be produced for a greater or smaller number of connecting elements. The geometric dimensions of the housing 1 will then vary correspondingly.

Figure 3:
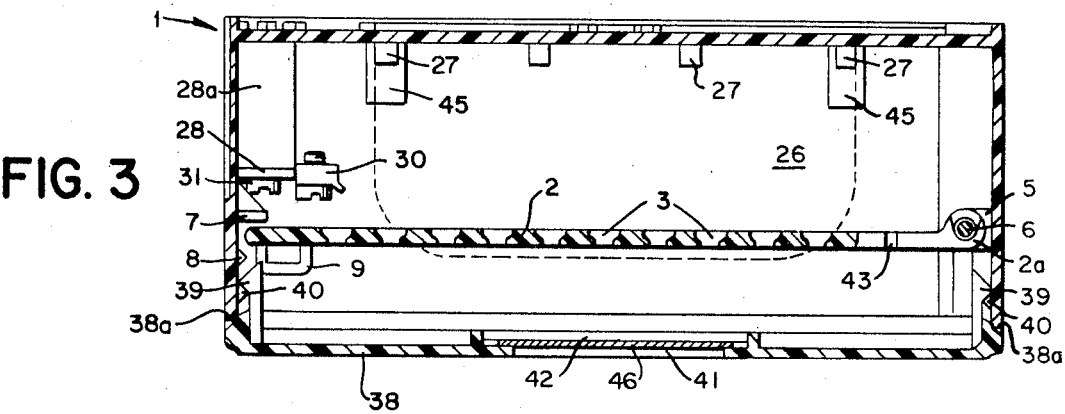
FIG. 3 is a top view of the cable distribution box, without connecting blocks, in a section taken along line 3—3 of FIG. 1.

The oblong slots 3 serve either to bring the incoming and outgoing wires to the attaching elements to be described later or to receive so-called B-wire connectors or wire-connecting sleeves 4 (see FIG. 6). To facilitate the introduction of the connectors 4 into the slots 3, the latter conically widen toward the rear wall (see FIGS. 3 and 6). The slots 3 are so dimensioned that, due to the elasticity of the material used for the production of the mounting plates, several sizes of B-wire connectors 4 can be secured in the slots. The connectors 4 have thus an excellent fit in the mounting plates 2.

The plates 2 have molded-on hinge lugs 2a which are inserted into corresponding recesses in hinge lugs 5 of housing 1 and secured for rotation by a hinge pin 6 passing therethrough. In the closed state, the mounting plates 2 rest in the housing 1 on bearing surfaces 7 and are secured by projections 8 against accidental swinging. On the plates 2 are provided loops 9 (FIGS. 1 and 5) so that the plates 2 are easier to open. The assemblyman can thus overcome easily the resistance on the projection 8 by means of a lever, for example, a screwdriver (see elements 7 to 9 in FIG. 3; elements 7 and 8 are omitted from the top of FIG. 1 for the sake of clarity).

Figure 2:
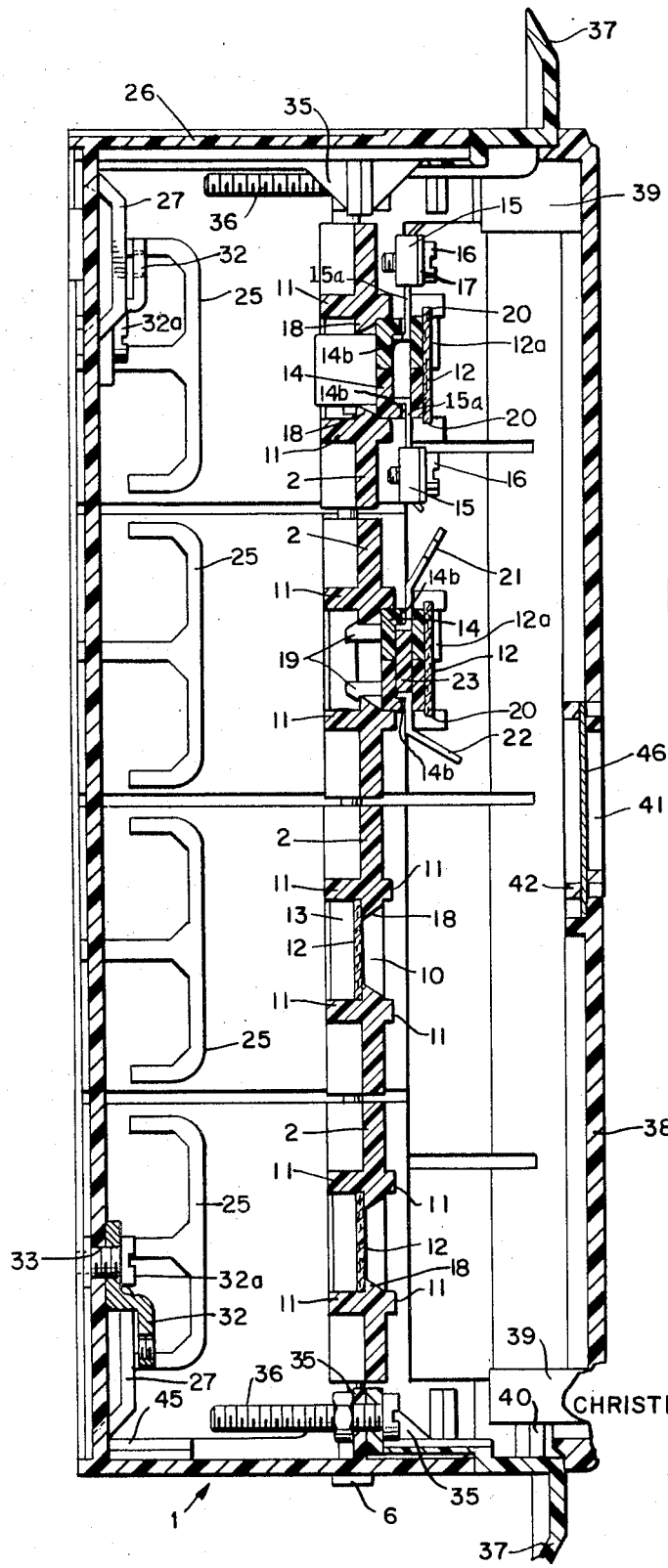
FIG. 2 is a side view of the cable distribution box, for under-plaster mounting, in a section, with the cover applied.
Figure 5:
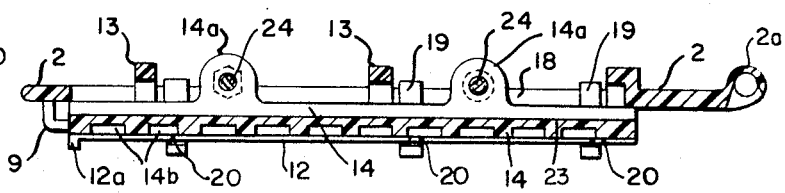
FIG. 5 shows a top view of a connecting block attached to a mounting plate.

In each mounting plate 2 is also provided a rectangular opening 10, conical at the long sides in a direction toward the rear wall (see FIG. 2). At either side along the opening 10 are arranged ribs 11 on the front sides of the plates 2. The ribs 11 continue on the rear sides of the plates 2 (see FIG. 2). If wire connecting sleeves 4 are used (FIG. 6), a designation strip 12 may be inserted on the rear side of the mounting plates 2, which is prevented from falling out to the rear by crossbars 13 provided on the rear of the mounting plates 2 (FIG. 5). The designation strips 12 are prevented by stops 12a from sliding laterally.

Figure 1:
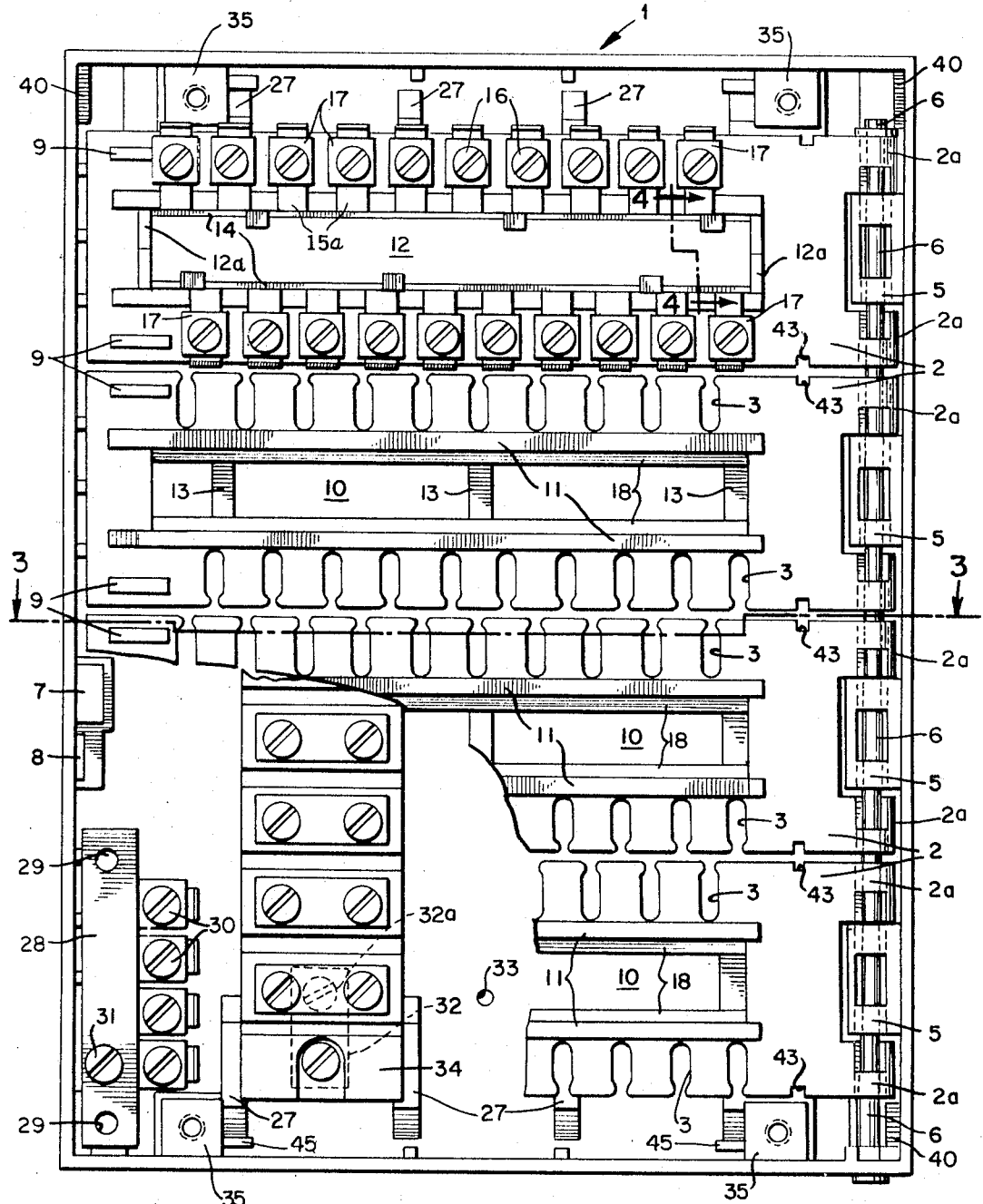
Figure 4:
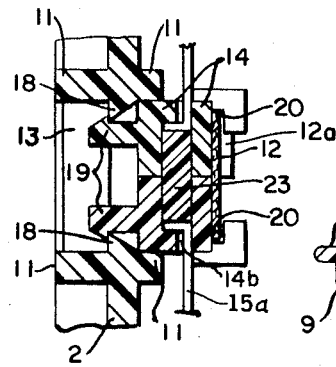
FIG. 4 shows on a larger scale a mounting plate as appearing in FIGS. 1 and 2, with a connecting block, in a section taken along line 4—4 of FIG. 1.

The cable distribution box according to the invention is so designed that, apart from the connection of wires by means of B-wire connectors 4, other known attaching possibilities can also be used, for example, clamping, soldering or coiling means. In this case a connecting element or block 14 with attaching elements, such as clamping pins 15, soldering pins 21 and/or coiling pins 22, is inserted into the rectangular openings 10 of the mounting plates 2 and locked there (FIG. 1, top as well as FIGS. 2 and 4). Frequently the wires of telecommunication cables are preferably secured by clamping. The connecting blocks 14 can therefore be equipped with the aforementioned attaching elements, for example, the clamping pins 15 (FIG. 1), having flat terminal portions 15a inside the blocks 14, as shown in FIG. 2. To ensure satisfactory contacts, spring plates 17 are arranged on the pins 15, under respective clamping screws 16.

The rectangular openings 10 in the mounting plates 2 are conical at the long sides (FIG. 2) in the direction of the rear wall of the housing 1 so that the edges act as opposing teeth 18. These teeth are engaged by spring-like hooks 19 in the attachment of a connecting block 14, which are molded on the foot end of the block 14. It suffices if six spring-like hooks 19 are arranged on each connecting block 14 in parallel groups of two. They are secured laterally against displacement by the crossbars 13 on which bear on the opposite side two spring-like hooks 19 each. The connecting blocks 14 are guided and held additionally by the lateral limitation of the ribs 11.

These ribs have on the rear sides of the mounting plates 2 only the function of stiffening the plates. At the head end, the connecting blocks 14 are provided with grooves 20 into which are inserted designation strips 12 when connecting blocks 14 are secured to respective mounting plates 2.

As shown in FIG. 4, the connecting blocks 14 consist of two symmetrical half shells. Consequently only one mold is required for their production. The connecting blocks 14 are so designed that attaching elements in the form of either the afore-mentioned clamping pins 15, of the soldering pins 21 or the coiling pins 22 can be arranged at both sides, parallel to each other, in appropriate holes or openings 14b (see FIGS. 2, 4 and 5). The same molded part is used for the indicated pin forms in the production of the connecting blocks 14.

The attaching elements, such as the clamping, soldering and coiling pins 15, 21 and 22, respectively, are inserted in separate operations into the blocks 14. The advantage of this manufacturing method is that no metal parts are pressed into the insulator body. As known, tension cracks appear in the insulator in the case of molded-in metal parts due to the different coefficients of thermal expansion of the different materials. This leads to increased waste. Beyond that, the mold can be considerably simplified in constructional respects if the insulator is pressed or injection molded without metal parts.

The holes 14b in the connecting blocks 14 are so selected that the inserted connecting pins are staggered (as are the pin portions 15a with the screws 16 and spring plates 17 in FIG. 1) when the symmetrical half shells are assembled. This way one clamping 15, soldering pin 21, or winding pin 22 is always above an oblong slot 3 of the mounting plate 2. This arrangement presupposes that the slots 3 are likewise staggered on the opposite sides of the plates 2, as shown in FIG. 1.

The attaching elements 15, 21, 22 are so designed that the respective incoming and outgoing wires can be connected. The soldering pins 21 have therefore two notches so that the conductors or wires can be better soldered on. The coiling pins 22 have in a known manner a rectangular cross section. The clamping, soldering and coiling pins 15, 21, 22 are bent inside the insulator body of the connecting blocks 14 to an angle, e.g. of 90 degrees, as shown in FIG. 2, so that the inner ends of the pins point toward the interior of the housing 1. However, it would also be possible to arrange the angle in the opposite direction.

Between the opposing clamping, soldering and coiling pins 15, 21, 22, an insulating strip 23 is inserted into the respective connecting block 14. This way axial displacement of the pins is avoided. Besides, the strip 23 serves as a pressure equalizer in the case of the coiling pins 22, that is, the strip 23 counteracts the pressure exerted by a coiling gun used for attaching the wires. For easier access to the soldering and coiling pins 21 and 22, the latter are angularly bent outside the connecting blocks 14.

When using clamping pins 15, the insulating strip 23 can be omitted, as shown in the top portion of FIG. 2. The clamping screws 16 prevent in any way the displacement of the pins 15 in an axial direction.

The symmetrical half shells of the connecting blocks 14 are connected after insertion of the connecting pins on the rear sides by screw means 24 (see FIG. 5). For receiving the screws 24, corresponding tongues 14a are provided on the insulator body of each connecting block 14. In the proximity of the hinge lugs 5, two T-shaped wire guide forks 25 (see FIGS. 2 and 6) are connected under the mounting plates 2 with the cable distribution housing 1. On all sides of the housing 1 are provided break-out cable inlets 26 (see FIGS. 2, 3 and 6). The cables can therefore be led into and out of the housing from all sides. This is of particular advantage when several boxes must be mounted side by side or one above the other.

At the head and foot ends of the rear wall of the housing 1 there are arranged side by side several parallel tongues 27 (see FIG. 6) which are preferably integral with the housing. On these tongues 27 the incoming and/or outgoing cables are held by means of a strip, for example, a perforated strip, identified by numeral 27a. On the lateral cable inlets 26, tongues 27 are not required since at these points, as a rule, only cables with a smaller number of wires or pairs are led in or out, for which additional fastening is not necessary. The usual clamp arranged outside the housing is sufficient for fastening these cables.

On the side opposite the hinge lugs 5 is arranged on the rear wall a grounding plate 28 with two measuring bushes 29 and several parallel screw terminals 30, by means of a screw 31 or the like element. Preferably a socket 28a is provided for this purpose in the housing 1, both in the upper and in the lower corners, on which bears the grounding plate 28 in raised position in the housing.

The grounding plate 28 can be secured either at the top or at the bottom in the housing and it is possible to make tests with the mounting plates 2 closed, by means of a measuring plug. The wires which are connected to the screw terminals 30 can be conducted from the selected cable inlet 26 on the shortest way to the grounding plate 28. In practice it happens frequently that several conductors must be clamped to the same screw terminal 30. This is so designed that a maximum of four conductors can be connected at the same time.

On the rear wall of the housing 1 are secured fixing straps 32 (see FIG. 2) in specially provided holes 33 (FIG. 1) by means of screws 32a. On the fixing straps 32 are secured flat terminal strips 34 in such a way that a space is provided for the guidance of the cable wires between the strips 34 and the rear wall of the housing. The strips 34 are fastened vertically with respect to the mounting plates 2. The terminals of the strips 34 permit the connection of conductors with a larger cross section, for example, up to 6 sq. mm.

It is advantageous if a cable distribution box permits, in addition to the connection of telephone cable wires, also the mounting of control cable wires, for example, for clock systems. Due to the constantly increasing use of measuring, control and regulating techniques in all sectors of the economy, suitable connection possibilities must also be provided to an increasing extent in cable distribution boxes.

The box according to the invention takes into account the demand of the plant construction companies for the increased installation of control cables, in addition to telephone cables, insofar as a maximum of three flat terminal strips 34 can be arranged in the housing 1, for example, for forty double wires or pairs, without the telephone cables mounted on the plates 2 hindering each other or the control cables.

At both sides of the upper and lower cable inlets 26 are arranged fastening pieces 35 on which a blind frame 37 may be secured by means of distance bolts 36 or the like (see FIG. 2) for under-plaster installation of the cable distribution box. The distance bolts 36 have the function of bridging over the unavoidable tolerances in the plaster thickness.

The housing 1 is terminated by a cover 38. The cover can be attached either directly on the housing 1 or on the blind frame 37. To this end the cover 38 has at the four corners notches 39 which engage a fold 40 of the housing 1 or the blind frame 37.

In the center of the cover 38 is provided an opening 41 as a field of vision for a designation plate 46. The plate is held by stirrups 42 (FIGS. 2 and 3) on the inside of the cover 38. Since the cover can likewise be made of a suitable plastic, the stirrups 42 are preferably molded on.

The mounting of the inventive cable distribution box is effected so that one or several cables are introduced at the cable inlets 26 into the housing 1. In most cases the cables are led in or out at the head or foot ends of the housing. Corresponding to the number of incoming and out-going cables and their diameters, the pre-shaped openings of the cable inlets 26 are broken out or cut out. At the same time the cables are fixed at the tongues 27 by means of perforated tapes or the like expedients on the rear wall of the housing 1. The exposed wires of the telephone cables are conducted through the wire guide forks 25, by laying a loop which serves as a reserve, to the mounting plates 2.

If wire connecting sleeves 4 are used, the incoming and outgoing wires are connected in a known manner in the connectors 4. The latter are held in the slots 3 of the plates 2; to facilitate the mounting operation and to improve the guidance of the cable wires, the mounting plates 2 are swung out of the housing 1. The plates 2 are thus freely accessible from both sides.

If other connecting methods, such as clamping, soldering or coiling are to be used, one of the connecting blocks 14 with the corresponding attaching elements is inserted instead of the designation strip 12 in the opening 10 behind the mounting plate 2. Subsequent loosening of the connecting blocks 14 from the respective mounting plates 2 is effected by laterally pressing against the block 14 so that the spring-like hooks 19 are pressed aside by the elasticity of the plastic, and they are thus disengaged from the teeth 18. The slots 3 in the plates 2 serve in this case to divide the wires to be connected to the blocks 14.

As described, the respective incoming and out-going wires are applied to the attaching elements, for example, clamping, soldering or coiling pins 15, 21, 22, as explained hereinabove. Wires for control purposes can be connected in a known manner to the strips 34 under the plates 2, independently of the telephone cable wires.

After the mounting operations are completed, a fastening band, for example a rubber ring 44 (see FIG. 6), can be provided to improve the hold of the cable wires, on the mounting plates 2, in parallel opposite cut-outs 43. As an additional protection against moisture, an insulating plate (not shown) can be inserted on the inside of the housing between specially provided straps 45.

The mounted cable distribution box is then closed by the cover 38. To facilitate the opening of the cover, recesses 38a are provided on the latter above the notches 39 so that the latter can be pressed out of the folds 40 by means of a lever, for example, a screwdriver, and then the cover 38 can be easily removed.

It should be noted that FIGS. 1 and 2 do not strictly correspond with each other. In the top section of FIG. 1, a connecting block 14 is inserted in the mounting plate 2, together with a designation strip 12. The downwardly following three more sections show the plates 2 with their openings 10, without any element being inserted in these sections (of which some are broken away to show the underlying structure). The block 14 in the top section displays the most commonly used clamping pins 15, 15a, 16, 17 which elements constitute a unit.

In FIG. 2, the top section is identical with that of FIG. 1; however, in the next following section, the inserted connecting block 14 has soldering pins 21 in its upper half and coiling pins 22 in the lower half. The two uppermost sections of FIG. 2 have been left vacant for a better illustration of the configuration of plates 2. It will be understood that a larger or smaller number of plates 2 than four can be provided in the inventive cable distribution box; also, the blocks 14 may have pins 21 only, or 22 only in both halves, and so on.

Figure 6:
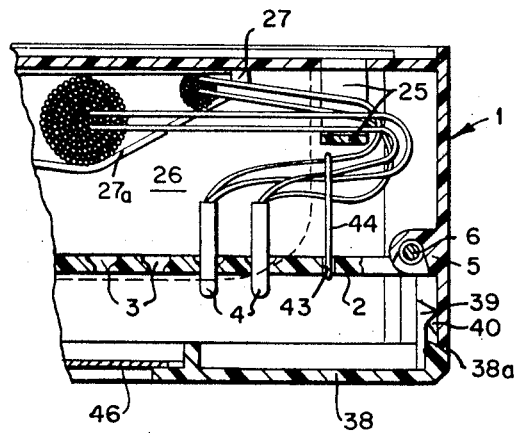
FIG. 6 is a broken-off top view of the cable distribution box (similar to FIG. 3), in a section which contains the representation of a modification with B-wire connectors.

The B-wire connectors 4 are shown only in FIG. 6, although, it will be appreciated, they may form part of the structures of FIGS. 1 and/or 2 wherever no blocks 14 are inserted in the respective plates 2.

What we claim is:

1. A cable distribution box comprising, in combination, a housing (1) having a front, rear and side walls, a cover (38) for the housing and engaging means (39, 40) for the cover, pivotable mounting plates (2) for receiving connecting elements (4, 14) adapted for the attachment of incoming and outgoing wires of telecommunication conductors and cables, hinge lugs (5) being provided on one of the side walls, with bearing surfaces (7) and projections (8) on the opposite side wall and superposed parallel substantially T-shaped wire guide forks (25) on the rear wall, flat terminal strips (34) secured to the rear wall in a parallel, vertical arrangement, for conductors having larger cross sections than the wires of the cables, the mounting plates (2) being disposed above the hinge lugs (5), for connecting wires of other telecommunication cables, there being a rectangular opening (10) in a horizontal direction substantially in the center of each mounting plate, the opening being conical at the long sides in a direction toward the rear wall, vertical crossbars (13) molded on the rear of the mounting plates (2) and interrupting the openings (10), ribs (11) formed on the front of the mounting plates for laterally limiting the opening (10) such that a connecting element (14) when inserted into the opening is guided between the ribs, and safety means (18, 19) for locking the inserted connecting element (14) to the mounting plate (2).

2. The cable distribution box as defined in claim 1, wherein the mounting plates (2) have thereon loop portions (9) and hinge lugs (2a) to permit the mounting plates to be swung out of the housing (1), the mounting plates further having parallel, opposite cut-outs (43) at least on their ends closer to their pivots, for holding the wires.

3. The cable distribution box as defined in claim 1, further comprising fastening stirrups (32) adapted to be secured (32a) into holes (33) pressed into the rear wall, for holding the terminal strips (34) in a spaced relation with respect to the rear wall so as to accommodate the conductors and wires therebetween.

4. The cable distribution box as defined in claim 1, further comprising a grounding plate (28) with measuring bushes (29) and at least one screw terminal (30) secured thereto, the grounding plate being attachable to the rear wall by screw means (31).

5. The cable distribution box as defined in claim 1, further comprising tongues (27) rigid with the rear wall and adapted for attaching thereto the cables leading to and from the housing (1).

6. The cable distribution box as defined in claim 1, wherein the housing (1) has on at least one side at least one inlet (26) that can be broken away for admitting the cables.

7. The cable distribution box as defined in claim 6, further comprising straps (45) disposed on both sides of the cable inlets (26), at the top and the foot ends of the housing (1), moisture insulating plate means adapted to be held between the straps, and folds (40) provided in the corners of the housing and constituting the engaging means (39, 40), for holding the cover (38) in a moisture-proof manner.

8. The cable distribution box as defined in claim 1, further comprising fastening pieces (35) on at least two side walls, and a frame (37) for under-plaster installation, interposed between the housing (1) and the cover (38), by way of the fastening pieces (35), and with adjustable distance bolt means (36) allowing to compensate for varying plaster thicknesses, portions of the frame constituting the engaging means (39, 40) for the cover.

9. The cable distribution box as defined in claim 1, wherein the cover (38) has notches (39) in the corners, adapted to mate with the engaging means (40).

10. The cable distribution box as defined in claim 1, further comprising a stirrup (42) integrally formed on the rear of the cover (38) which is provided with an opening (41) for disposing therein a designation plate (46).

11. The cable distribution box as defined in claim 1, wherein the connecting elements (4, 14) are in the form of connecting blocks (14), further comprising opposing teeth (18) formed in the opening (10) of the mounting plates (2) and spring-like hooks (19) on the connecting blocks (14), the hooks being adapted to be engaged by the teeth (18), and thus forming therewith the safety means (18, 19).

12. The cable distribution box as defined in claim 11, further comprising designation strips (12) inserted in grooves (20) of the connecting elements (14).

13. The cable distribution box as defined in claim 11, wherein the connecting blocks (14) consist of two symmetrical half shells held together by screw means (24).

14. The cable distribution box as defined in claim 11, wherein the connecting blocks (14) have openings (14b) for receiving attaching means (15, 21, 22) for the wires.

15. The cable distribution box as defined in claim 14, wherein the attaching means (15, 21, 22) include angularly inwardly bent terminal portions held inside the connecting blocks (14).

16. The cable distribution box as defined in claim 14, wherein the attaching means (15, 21, 22) are disposed in the openings of the connecting blocks (14) in a staggered arrangement, in two opposite rows, and further comprising an insulating strip (23) inserted between the rows.

17. The cable distribution box as defined in claim 14, wherein the attaching means (15) include flat terminal portions (15a) with clamping screws (17) secured to their free ends.

18. The cable distribution box as defined in claim 14, wherein the attaching means (21, 22) include forwardly bent free ends in the form of pins for attaching the wires selectively by soldering and by coiling.

19. The cable distribution box as defined in claim 11, wherein the mounting plates (2) have oblong, open slots (3) along their long sides, for passing therethrough the wires attached to the connecting block (14).

20. The cable distribution box as defined in claim 19, wherein the slots (3) along one side of the mounting plates (2) are staggered with respect to the slots on the opposite side.

21. The cable distribution box as defined in claim 19, wherein the slots (3) taper toward the cover (38) so as to present a narrower gap on the front of the mounting plates (2) than on the rear.

22. The cable distribution box as defined in claim 1, wherein the connecting elements (4, 14) are in the form of wire connectors (4) adapted to interconnect at least two of the wires.

23. The cable distribution box as defined in claim 22, wherein the wire connectors (4) are insertable with a press fit into oblong, open slots (3) along the long sides of the mounting plates (2).

24. The cable distribution box as defined in claim 20, further comprising a designation strip (12) inserted in one of the mounting plates (2), behind the opening (10), and between the teeth (18) and the crossbar (13).

References Cited

UNITED STATES PATENTS

| | | | |
|---|---|---|---|
| 1,122,290 | 12/1914 | Mack et al. | 174—59 |
| 1,243,902 | 10/1917 | Van Ranst | 174—60 |

DARRELL L. CLAY, *Primary Examiner.*

D. A. TONE, *Assistant Examiner.*

U.S. Cl. X.R.

317—118, 120

PO-1050
(5/69)

UNITED STATES PATENT OFFICE
CERTIFICATE OF CORRECTION

Patent No. 3,445,585          Dated May 20, 1969

Inventor(s) C. Meisel et al.

It is certified that error appears in the above-identified patent and that said Letters Patent are hereby corrected as shown below:

Claim 19, line 4 (column 10 of patent, line 44), "block" should correctly read -- blocks --; and claim 24, line 1 (column 10, line 61), "20" should read -- 22 --.

SIGNED AND
SEALED

AUG 26 1969

(SEAL)
Attest:

Edward M. Fletcher, Jr.
Attesting Officer

WILLIAM E. SCHUYLER, JR.
Commissioner of Patents